(12) United States Patent
Zenitani et al.

(10) Patent No.: US 8,617,375 B2
(45) Date of Patent: Dec. 31, 2013

(54) METHOD FOR REDUCING CARBON DIOXIDE

(75) Inventors: Yuji Zenitani, Nara (JP); Masahiro Deguchi, Osaka (JP); Satoshi Yotsuhashi, Osaka (JP); Reiko Taniguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/276,926

(22) Filed: Oct. 19, 2011

(65) Prior Publication Data

US 2012/0031770 A1 Feb. 9, 2012

Related U.S. Application Data

(63) Continuation of application No. PCT/JP2011/002071, filed on Apr. 7, 2011.

(30) Foreign Application Priority Data

Apr. 26, 2010 (JP) ................................. 2010-100588

(51) Int. Cl.
  C25B 3/00 (2006.01)
  C25B 1/24 (2006.01)
  C25B 1/00 (2006.01)

(52) U.S. Cl.
  USPC ........... 205/413; 205/440; 205/448; 205/450; 205/455; 205/462; 205/499; 205/555

(58) Field of Classification Search
  USPC ......... 205/440, 340, 413, 448, 450, 455, 462, 205/499, 555
  See application file for complete search history.

(56) References Cited

U.S. PATENT DOCUMENTS

| | | | |
|---|---|---|---|
| 3,514,335 A | * | 5/1970 | Grubb .......................... 429/447 |
| 4,098,669 A | | 7/1978 | De Nora et al. |
| 4,146,438 A | | 3/1979 | de Nora et al. |
| 5,427,761 A | | 6/1995 | Grindatto et al. |

(Continued)

FOREIGN PATENT DOCUMENTS

| EP | 0 390 157 A2 | 10/1990 |
|---|---|---|
| JP | 52-141490 A | 11/1977 |

(Continued)

OTHER PUBLICATIONS

Matthew R. Hudson. "Electrochemical Reduction of Carbon Dioxide." Department of Chemistry, State University of New York at Potsdam, Potsdam, NY 13676. Submission date: Dec. 9, 2005.*

(Continued)

*Primary Examiner* — Edna Wong
(74) *Attorney, Agent, or Firm* — McDermott Will & Emery LLP (57) ABSTRACT

The method for reducing carbon dioxide of the present invention includes a step (a) and a step (b) as follows. A step (a) of preparing an electrochemical cell. The electrochemical cell comprises a working electrode (21), a counter electrode (23) and a vessel (28). The vessel (28) stores an electrolytic solution (27). The working electrode (21) contains boron carbide. The electrolytic solution (27) contains carbon dioxide. The working electrode (21) and the counter electrode (23) are in contact with the electrolytic solution (27). A step (b) of applying a negative voltage and a positive voltage to the working electrode and the counter electrode, respectively, to reduce the carbon dioxide.

3 Claims, 5 Drawing Sheets

(56) References Cited

U.S. PATENT DOCUMENTS

| | | | |
|---|---|---|---|
| 5,965,004 | A | 10/1999 | Cowley et al. |
| 2006/0141346 | A1* | 6/2006 | Gordon et al. ............... 429/112 |
| 2007/0160899 | A1* | 7/2007 | Atanassova et al. ............ 429/44 |
| 2010/0258446 | A1* | 10/2010 | Mohapatra et al. ........... 205/340 |
| 2012/0018311 | A1 | 1/2012 | Yotsuhashi et al. |

FOREIGN PATENT DOCUMENTS

| | | | |
|---|---|---|---|
| JP | 01-313313 | | 12/1989 |
| JP | 3-111586 A | | 5/1991 |
| JP | 3-111586 U | | 5/1991 |
| JP | 04-290526 A | | 10/1992 |
| JP | 04-311586 A | | 11/1992 |
| JP | 05-220401 A | | 8/1993 |
| JP | 06290782 A | * 10/1994 | .............. H01M 4/58 |
| JP | 07-188961 | | 7/1995 |
| JP | 2000-254508 A | | 9/2000 |
| JP | 2001-089887 | | 4/2001 |
| JP | 2002/534351 A | | 10/2002 |
| JP | 2004-176129 A | | 6/2004 |
| JP | 2006-198570 A | | 8/2006 |
| JP | 2007-125532 A | | 5/2007 |
| JP | 4167775 B | | 8/2008 |
| JP | 4724783 B1 | | 7/2011 |
| WO | WO-00/41808 A1 | | 7/2000 |

OTHER PUBLICATIONS

Wayback machine of Hudson reference: evidence of internet archive data on Sep. 7, 2006.*

Hara et al., "Electrochemical Reduction of Carbon Dioxide Under High Pressure on Various Electrodes in an Aqueous Electrolyte", J. of Electroanalytical Chem. (no month, 1995), vol. 391, pp. 141-147.*

D. Behar et al., "Cobalt Porphyrin Catalyzed Reduction of $CO_2$ Radiation Chemical, Photochemical, and Electrochemical Studies," Journal of Physical Chemistry A, vol. 102, p. 2870-2877, 1998.

M. Rudolph et al., "Macrocyclic $[N_4^2]$Coordinated Nickel Complexes as Catalysts for the Formation of Oxalate by Electrochemical Reduction of Carbon Dioxide," Journal of American Chemical Society, vol. 122, p. 10821-10830, 2000.

Y. Hori et al., "Production of CO and $CH_4$ in Electrochemical Reduction of $CO_2$ at Metal Electrodes in Aqueous Hydrogencarbonate Solution," Chemistry Letters, pp. 1695-1698, 1985.

Y. Hori et al., "Formation of Hydrocarbon in the Electrochemical Reduction of Carbon Dioxide at a Copper Electrode in Aqueous Solution," Journal of Chemical Society, Faraday Transactions 1, vol. 85, Issue 8, p. 2309-2326, 1989.

B. Hammer et al., "CO Chemisorption at Metal Surfaces and Overlayers," The American Physical Society, vol. 76, No. 12, p. 2141-2144, Mar. 18, 1996.

International Search Report issued in International Patent Application No. PCT/JP2011/002070 dated May 24, 2011.

* cited by examiner

METHOD FOR REDUCING CARBON DIOXIDE

RELATED APPLICATIONS

This application is a continuation of PCT International Application PCT/JP2011/002071 filed on Apr. 7, 2011, which claims priority to Japanese Patent Application No. 2010-100588 filed on Apr. 26, 2010. The disclosures of these applications including the specifications, the drawings, and the claims are hereby incorporated by reference in their entirety.

BACKGROUND OF THE INVENTION

1. Field of the Invention

The present invention relates to a method for reducing carbon dioxide.

2. Description of Related Art

A carbon dioxide ($CO_2$) reduction technique using a catalyst is expected as a technique for fixing $CO_2$ and producing useful substances. The reduction technique is one of the important means for solving the problem of greenhouse gas-induced global warming believed to be significant in the future. As the $CO_2$ reduction techniques using a catalyst, a catalytic hydrogenation method and an electrochemical method (electrolytic reduction method) have been studied so far. In the catalytic hydrogenation method, $CO_2$ reacts catalytically with hydrogen ($H_2$) to be reduced under a high temperature and high pressure gas phase condition. The catalytic hydrogenation method allows $CO_2$ to be converted into highly useful substances such as methanol (JP 4167775 B and JP 1 (1989)-313313 A).

In the electrolytic reduction method, the reducing reaction proceeds even at an ordinary temperature and ordinary pressure. The electrolytic reduction method requires no large-scale equipment. Thus, the electrolytic reduction method is simpler than the catalytic hydrogenation method. Accordingly, the electrolytic reduction method is considered as an effective $CO_2$ reduction method. As catalysts capable of reducing $CO_2$ by the electrolytic reduction method, solid single metals such as copper (Cu) and silver (Ag), alloy materials of these, and complex materials (molecular catalysts) such as a cobalt (Co) complex, a nickel (Ni) complex and an iron (Fe) complex have been developed so far (Journal of Physical Chemistry A Vol. 102 p.p. 2870 (1998), Journal of American Chemical Society Vol. 122 p.p. 10821 (2000), and Chemistry Letters p.p. 1695 (1985)).

SUMMARY OF THE INVENTION

Generally, $CO_2$ is a very stable molecule. Thus, the $CO_2$ reduction treatment by the catalytic hydrogenation method requires a high temperature (a heating temperature of 300° C.) and a high pressure (a reaction pressure of 50 atmospheres) for a reaction proceeding. Furthermore, the catalytic hydrogenation method uses a flammable gas such as $H_2$. For these reasons, the catalytic hydrogenation method requires to install large-scale equipment. The catalytic hydrogenation method has a problem in that a great deal of energy must be input into the reduction treatment and in that the energy utilization efficiency is very low.

Moreover, the solid single metals, the alloy materials, and the molecular materials used as catalysts in the electrolytic reduction method have a durability problem in that they deteriorate severely with time during the long-time catalytic reaction. Thus, a catalyst material that is capable of reducing $CO_2$ by the electrolytic reduction method and has high practicability has not been found yet.

Accordingly, it is an object of the present invention to provide a method for reducing carbon dioxide using a highly-durable catalyst that is capable of reducing $CO_2$ at an overvoltage equal to or lower than overvoltages required for conventional catalysts to produce highly useful substances (such as formic acid (HCOOH), methane ($CH_4$), ethylene ($C_2H_4$), and ethane ($C_2H_6$)).

A method for reducing carbon dioxide according to the present invention includes:

a step (a) of preparing an electrochemical cell, wherein the electrochemical cell comprises a working electrode, a counter electrode and a vessel, the vessel stores an electrolytic solution, the working electrode contains boron carbide, the electrolytic solution contains carbon dioxide, the working electrode is in contact with the electrolytic solution, and the counter electrode is in contact with the electrolytic solution; and a step (b) of applying a negative voltage and a positive voltage to the working electrode and the counter electrode, respectively, to reduce the carbon dioxide.

The electrochemical cell is used in the method for reducing carbon dioxide of the present invention. The electrochemical cell comprises the working electrode for reducing carbon dioxide. The working electrode contains boron carbide. Boron carbide is capable of reducing carbon dioxide at an overvoltage equal to or lower than overvoltages required for conventional catalysts for reducing carbon dioxide. Therefore, the method of the present invention makes it possible to produce highly useful substances, such as HCOOH, $CH_4$, $C_2H_4$ and $C_2H_6$, at an overvoltage equal to or lower than overvoltages required in conventional methods. Furthermore, the high durability of boron carbide allows the working electrode to achieve high durability.

DETAILED DESCRIPTION OF THE INVENTION

Hereinafter, the method for reducing carbon dioxide according to the present invention will be described with reference to the drawings.

The method for reducing carbon dioxide ($CO_2$) of the present invention is a method for reducing $CO_2$ electrochemically. In the method of the present invention, an electrochemical cell is prepared first. The electrochemical cell comprises an electrode (working electrode) used to reduce $CO_2$. The working electrode contains boron carbide ($B_4C$).

A slurry solution is prepared by dispersing, in an organic solvent, boron carbide particles ($B_4C$ particles) obtained by a carbonization treatment. The $B_4C$ particles have an average particle diameter of about several micrometers. Then, an appropriate amount of the slurry solution is applied to a conductive carbon paper (CP) that has carbon fibers woven therein and is to be used as an electrode substrate. Thus, a working electrode (catalyst) in which the $B_4C$ particles are supported on the CP is fabricated. The CP is porous. Therefore, it is difficult to specify clearly the amount of the $B_4C$ particles supported. However, the amount of $B_4C$ particles supported is about several tens of micrograms/$cm^2$ to 1 milligram/$cm^2$. The electrode substrate is not limited to the CP as long as it has conductivity. For example, an inert metal substrate such as a gold (Au) substrate, a glassy carbon substrate, and a conductive silicon substrate are commonly used besides the CP. Furthermore, the manufacturing method and shape of the $B_4C$ particles are not limited, either. For example, $B_4C$ in a shape of a thin film may be used instead of the $B_4C$ particles mentioned above. Even in the case of using an electrode structure in which $B_4C$ is deposited in a shape of a thin film on the surface of the conductive substrate by a method such as sputtering, it is possible to obtain the same catalytic activity as in the case of using the electrode structure in which the $B_4C$ particles are supported on the surface of the conductive substrate. Such an electrode production method may cause foreign matters to enter into the electrode during the production process. However, the catalytic activity occurs depending on the type of the compound used as a catalyst. Therefore, the foreign matters entering into the electrode during the production process do not affect the consequence of the catalytic activity of the compound.

As described above, the electrode substrate, the shape of the boron carbide supported on the substrate, etc. are diverse. However, since an electrolytic reaction in an electrolytic solution or an electrolytic reaction utilizing a gas diffusion electrode are carried out in the actual carbon dioxide reducing treatment, it is necessary to adjust the supporting or depositing method to be suitable for boron carbide so that the boron carbide can be stably supported or deposited on the substrate.

Next will be described the result of analytic evaluation on substances produced when $CO_2$ is subject to the electrochemical treatment using the working electrode containing the $B_4C$ particles. The substances produced by the $CO_2$ reduction using the working electrode include a gaseous component and a liquid component. In the present embodiment, gas chromatograph is used for analyzing the gas components and liquid chromatograph is used for analyzing the liquid components. As a result, it can be confirmed that $CO_2$ is reduced to produce HCOOH, $CH_4$, $C_2H_4$, and $C_2H_6$. The theoretical background of finding these is as follows.

Figure 1:
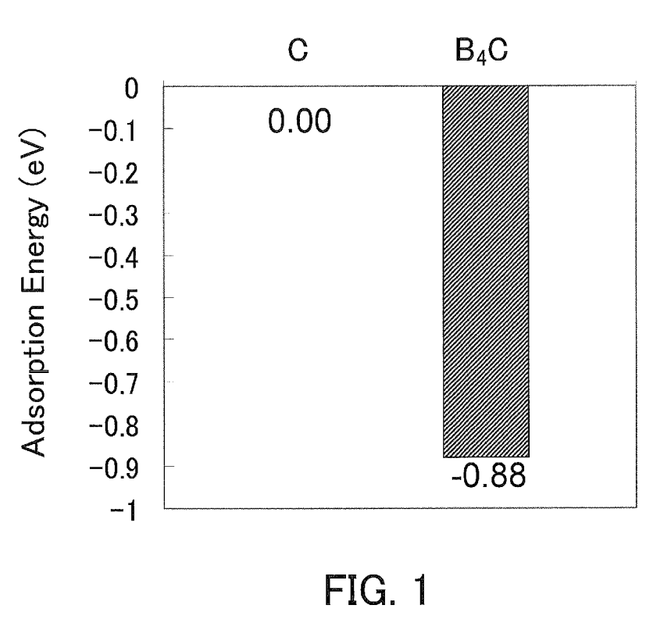
FIG. 1 is a graph showing a comparison between an adsorption energy value of carbon monoxide (CO) on a surface of carbon (C) and an adsorption energy value of carbon monoxide (CO) on a surface of boron carbide ($B_4C$).

FIG. 1 shows adsorption energy values (Ea) of CO on a surface of graphite (C) and a surface of boron carbide ($B_4C$) estimated from simulations (electronic structure calculations) based on density functional theory. Generally, in order to cause effectively a catalytic reaction on a surface of a solid matter, it is important for the solid matter to have an appropriate magnitude of Ea value. For example, an excessively large Ea value strengthens the absorption of molecules on the surface of the solid matter, thereby stabilizing the molecules on the surface of the solid matter. This makes it difficult for a reaction to occur, reducing the possibility of the catalytic reaction occurring. In contrast, an excessively small Ea value lowers the probability of the molecules being present on the surface of the solid matter. This also reduces the possibility of the catalytic reaction occurring, which is not preferable. It is known, for example, that metal copper (Cu) causes a reducing reaction of $CO_2$ relatively effectively. It is reported that the Ea value of CO on a surface of Cu is about $-0.62$ eV (B. Hammer et al., Physical Review Letter Vol. 76 p.p. 2141 (1996)).

From this viewpoint, a comparison is made between graphite (C) and boron carbide ($B_4C$). As shown in FIG. 1, the Ea value of CO on graphite (C), which is not a compound, is 0.00 eV. Thus, in the case of using graphite (C) as the working electrode, the working electrode adsorbs no CO, and it is presumed accordingly that a catalytic reaction hardly proceeds. In contrast, the Ea value of CO on boron carbide ($B_4C$) is as low as about $-0.88$ eV. Moreover, a similar calculation confirms that an adsorption structure is obtained on a surface of $B_4C$ at a relatively small energy also in the case of $CO_2$ adsorption. Thus, it is conceivable that neither the adsorption of CO on the surface of $B_4C$ nor the adsorption of $CO_2$ on the surface of $B_4C$ are too weak and a catalytic reaction occurs very easily.

In a common electrolytic reduction process of $CO_2$, $CO_2$ present near a surface of an electrode is reduced by a reaction between electrons injected from the electrode and protons in a solution. As a result, HCOOH is produced. Moreover, part of $CO_2$ is reduced to weakly-adsorbed CO by the reaction between the electrons injected from the electrode and the protons, and the weakly-adsorbed CO further is subject to the reaction between the electrons injected and the protons. As a result, hydrocarbon, such as $CH_4$, conceivably is produced (Y. Hori et al., Journal of Chemical Society, Faraday Transaction 1 Vol. 85 p.p. 2309 (1989)).

In view of this, it is conceived that the above-mentioned reactions proceed also with $CO_2$ adsorbed on $B_4C$. As a result, HCOOH, $CH_4$, $C_2H_4$ and $C_2H_6$ conceivably are produced.

On the other hand, the same calculation was made with respect to a surface of Cu. As a result, the adsorption energy of $CO_2$ on the surface of Cu was almost 0. That is, a stable $CO_2$ adsorption structure is hardly obtained on the surface of Cu. It is known that in a common reducing reaction process of $CO_2$, a high overvoltage is needed in a process in which one electron moves to a $CO_2$ molecule and then the $CO_2$ molecule is adsorbed on a surface of a catalyst. Thus, in case of a catalyst containing Cu on which $CO_2$ is not adsorbed stably, a high overvoltage is needed in the process in which $CO_2$ is adsorbed on the surface of the catalyst. In contrast, in the case of $B_4C$ used in the method for reducing $CO_2$ of the present invention, $CO_2$ can be adsorbed on the solid surface of $B_4C$ at a small adsorption energy as described above. This indicates that $B_4C$ is capable of lowering the overvoltage required for reducing $CO_2$.

$B_4C$ used as a catalyst in reducing $CO_2$ causes the reducing reaction of $CO_2$ only with an external energy from DC power supply at ordinary temperature. Moreover, the method for reducing $CO_2$ of the present invention can be applied to methods using a solar cell as an external power supply. The catalyst for reducing $CO_2$ can be applied, by combination with a photocatalyst, to catalysts that can be used with solar energy.

The method for reducing $CO_2$ using $B_4C$ is very simple because it can be carried out by blowing $CO_2$ gas into an electrolytic solution or by forming a three-phase boundary with a gas diffusion electrode. Thus, it can be said that the method for reducing $CO_2$ using $B_4C$ is a very promising technique as an energy-saving measure for $CO_2$ in places where large-scale equipment cannot be installed in houses and communities.

Figure 2:
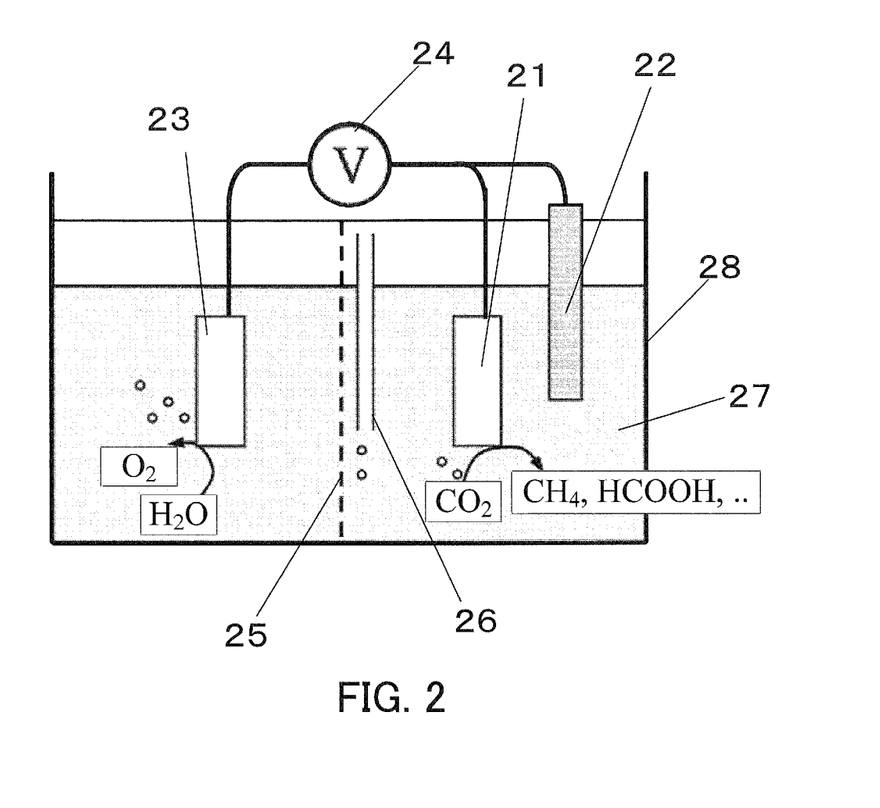
FIG. 2 is a structural drawing of an electrochemical cell used for measurements in the present invention.

Next, an example of the electrochemical cell used in the method for reducing $CO_2$ of the present invention will be described. An electrochemical cell having the same configuration as that of a cell (see FIG. 2) used in Examples below will be exemplified. That is, as shown in FIG. 2, the electrochemical cell of the present embodiment comprises a working electrode 21, a counter electrode 23, and a vessel 28. This vessel 28 stores an electrolytic solution 27. The working electrode 21 and the counter electrode 23 are electrically connected to each other and in contact with the electrolytic solution 27. The electrolytic solution 27 contains $CO_2$. The vessel 28 comprises a solid electrolyte membrane (for example, cation exchange membrane) 25. The solid electrolyte membrane 25 is disposed between the working electrode 21 and the counter electrode 23. The solid electrolyte membrane 25 separates the vessel 28 into a region of the working electrode 21 and a region of the counter electrode 23. The electrochemical cell comprises further a gas introduction tube 26 that functions as a gas inlet. One end of the gas introduction tube 26 is disposed in the electrolytic solution 27. In the case of reducing $CO_2$ using this electrochemical cell, the step of applying a negative voltage and a positive voltage to the working electrode 21 and the counter electrode 23, respectively, is carried out. In this step, $CO_2$ is supplied to the electrolytic solution 27 through the gas introduction tube 26, for example. The working electrode 21 contains boron carbide ($B_4C$). In FIG. 2, the working electrode 21 and the counter electrode 23 are completely immersed in the electrolytic solution 27. However, the placement of the working electrode 21 and the counter electrode 23 are not limited to this. The working electrode 21 and the counter electrode 23 have only to be placed in contact with the electrolytic solution 27. The electrochemical cell shown in FIG. 2 is a three-electrode cell provided further with a reference electrode 22 for the measurements in Examples. However, the reference electrode 22 need not be provided, because it is not necessary to measure the potential when the electrochemical cell is used for reducing $CO_2$. An example of the material for the counter electrode 23 is a metal such as platinum and nickel, and a metal oxide such as $Cr_2O_3$. By selecting a material that requires a low overvoltage in an oxygen evolution reaction that occurs on the counter electrode 23, it is possible to reduce carbon dioxide at a lower applied voltage.

The method for reducing $CO_2$ of the present invention can be carried out using the cell shown in FIG. 2. In this method, an electrochemical cell as shown in FIG. 2 is prepared first. Subsequently, a negative voltage and a positive voltage are applied to the working electrode 21 and the counter electrode 23, respectively. Preferably, the absolute value of a potential difference is 2.0 V or more. Through these steps, $CO_2$ contained in the electrolytic solution 27 is reduced and thereby highly useful substances can be produced.

From the disclosure above, the following inventions further are achieved.

An electrode used to reduce carbon dioxide, the electrode containing boron carbide.

A catalyst for reducing carbon dioxide, the catalyst containing boron carbide.

EXAMPLES

In the following examples, the catalyst used in the method for reducing $CO_2$ will be described in further detail.

Example 1

A conductive carbon paper (CP) with a thickness of 0.3 mm was prepared as an electrode substrate. Boron carbide particles with an average particle diameter of 1 μm ($B_4C$ particles with a purity of 99.9%) were supported on the CP at a distribution density of about $1\times10^7$ particles/cm$^2$. Thus, the catalyst of the present example was produced. An electrochemical reducing reaction of $CO_2$ was carried out using this catalyst. FIG. 2 shows a structural drawing of the electrochemical cell used for the measurement in the present example. The electrochemical cell was a three-electrode cell provided with the working electrode 21, the reference electrode 22, and the counter electrode 23. In this cell, the catalyst produced according to the present example was used in the working electrode 21. A silver/silver chloride electrode (Ag/AgCl electrode) was used as the reference electrode 22. A platinum electrode (Pt electrode) was used as the counter electrode 23. The electric potential applied to the three electrodes was swept by using potensiostat 24, and the reducing reaction of $CO_2$ was performed and evaluated. As the electrolytic solution 27, 0.1 M (0.1 mol/L) potassium bicarbonate aqueous solution ($KHCO_3$ aqueous solution) was used. The working electrode 21 and the counter electrode 23 were partitioned off with the solid electrolyte membrane to prevent gas components produced by the catalytic activity from mixing with each other. $CO_2$ gas was bubbled into the electrolytic solution 27 through the gas introduction tube 26 disposed in the cell so as to be introduced into the electrolytic solution 27.

The measurement was made as follows.

(1) First, nitrogen ($N_2$) gas was poured into the electrolytic solution 27 at a flow rate of 200 ml/min for 30 minutes so as to remain being bubbled. In the state in which $CO_2$ was excluded from the solution, the electric potential was swept and a curve of reaction electric current-electrolytic potential (C-V curve) was measured.

(2) Next, the tube was switched from nitrogen gas to $CO_2$ gas. $CO_2$ gas also was poured similarly into the electrolytic solution 27 at a flow rate of 200 ml/min for 30 minutes so as to remain being bubbled. In the state in which the electrolytic solution 27 was saturated with $CO_2$, the electric potential was swept and the C-V curve under the presence of $CO_2$ was measured.

Figure 3:
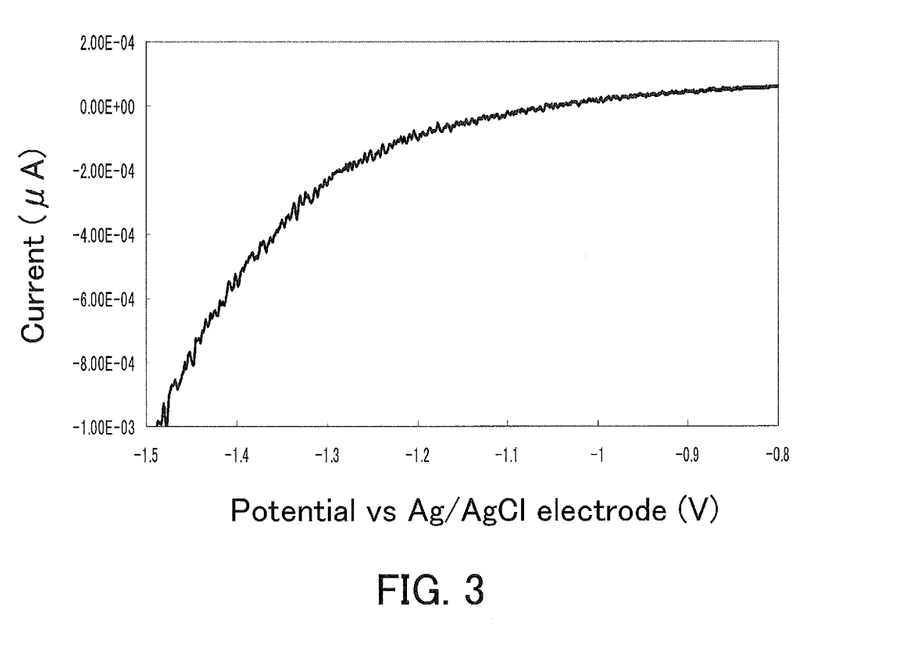
FIG. 3 is a graph showing the result of a reaction current-electrolytic potential measurement (C-V measurement) in the case of using boron carbide ($B_4C$).

The difference between the C-V curve obtained in the state (1) (the state in which $CO_2$ was excluded from the electrolytic solution 27) and the C-V curve obtained in the state (2) (the state in which the electrolytic solution 27 was saturated with $CO_2$) was calculated. Based on this difference, a reaction current (hereinafter referred to as a reducing current) produced by the reduction of $CO_2$ was evaluated. FIG. 3 shows the result thereof. In this figure, when the current value (vertical axis) is negative, it indicates that the reducing reaction of $CO_2$ has occurred. As shown in FIG. 3, the experiment in the present example shows that the reaction current fell from zero to a negative value where the potential E with respect to that of the silver/silver chloride electrode (Ag/AgCl electrode) was about −1.0 V. That is, in the case of the catalyst containing $B_4C$ particles, a reducing current of $CO_2$ was observed when the applied voltage was about −1.0 V with respect to that of the silver/silver chloride electrode (Ag/AgCl electrode). This means that the reduction starts when the applied voltage is about −0.8 V with respect to a standard hydrogen electrode. On the other hand, the $CO_2$ reduction experiment was performed on a catalyst containing single Cu instead of $B_4C$ by using this measurement system. As a result, an applied voltage higher than −1.1 V was necessary to cause the reducing reaction of $CO_2$. This result indicates that $B_4C$ is effective in lowering the overvoltage required for reducing $CO_2$.

Subsequently, the products of the reducing reaction of $CO_2$ in the case of using the catalyst containing $B_4C$ particles were analyzed. Gas components were analyzed using a gas chromatograph equipped with a hydrogen flame ionization detector (FID).

Figure 4:
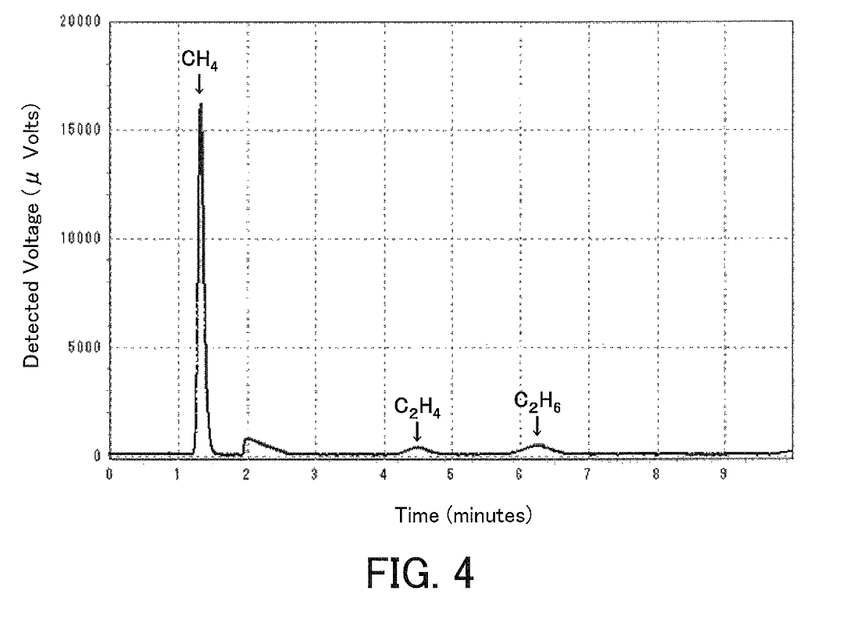
FIG. 4 is a graph showing the result of a gas chromatographic analysis indicating the production of methane ($CH_4$), ethylene ($C_2H_4$), and ethane ($C_2H_6$) in the case of using boron carbide ($B_4C$).

FIG. 4 shows the measurement result of detected methane ($CH_4$), ethylene ($C_2H_4$), and ethane ($C_2H_6$) with the FID gas chromatograph. This FID gas chromatograph was equipped with a Porapak Q separation column. The FID gas chromatograph was programmed so as to control the valve according to a predetermined time sequence, so that $CH_4$, $C_2H_4$ and $C_2H_6$ were detected after the elapse of about 1.5 minutes, 4.5 minutes and 6.5 minutes, respectively, from the start of the measurement. As a result, voltage peaks were observed at corresponding time domains as shown in FIG. 4. This confirmed the production of $CH_4$ and trace amounts of $C_2H_4$ and $C_2H_6$.

Figure 5:
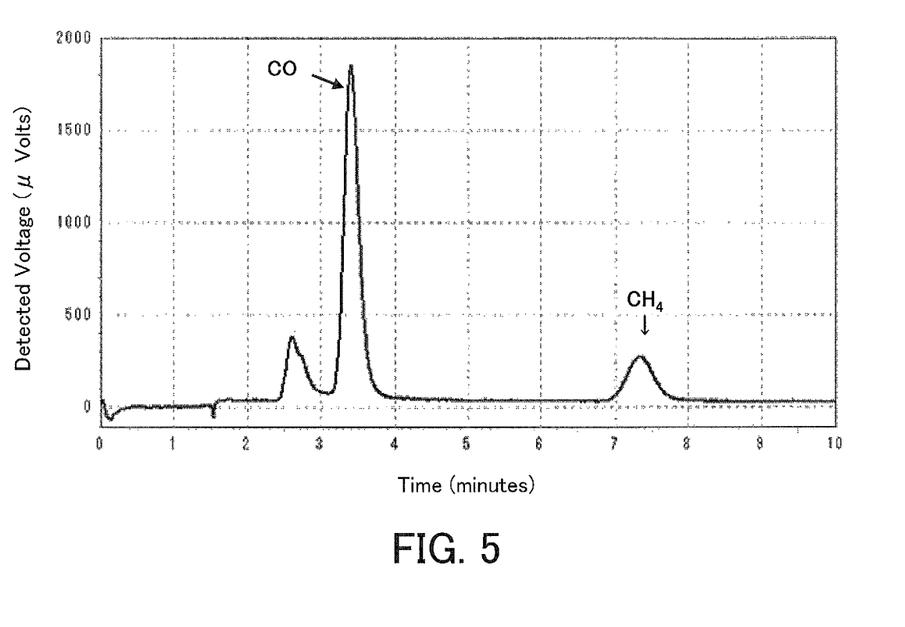
FIG. 5 is a graph showing the result of a gas chromatographic analysis indicating the production of carbon monoxide (CO) and methane ($CH_4$) in the case of using boron carbide ($B_4C$).

FIG. 5 shows the result of FID gas chromatographic measurement, which detected carbon monoxide (CO), etc. This FID gas chromatograph was equipped with a Porapak N separation column. In this case also, as with the above case, the FID gas chromatograph was programmed so as to control the valve according to a predetermined time sequence, so that CO and $CH_4$ were detected after the elapse of about 3.2 minutes and 7.2 minutes, respectively, from the start of the measurement. As a result, voltage peaks were observed at corresponding time domains as shown in FIG. 5. This confirmed the production of CO and $CH_4$. As described above, the production of CO, $CH_4$, and $C_2H_6$ was finally confirmed based on the analysis results of the product of the catalytic reaction.

Comparative Example 1

The reducing current of $CO_2$ was measured using an electrode composed only of the CP used as the electrode substrate in Example 1. The $CO_2$ reducing current was measured by the same method as in Example 1. As a result, no $CO_2$ reducing current was observed. That is, the electrode composed only of the CP was inactive in the $CO_2$ reduction. Only one product of the electrolytic reaction was hydrogen ($H_2$).

From the results above, it was confirmed that $B_4C$, which is a highly durable compound, is capable of reducing $CO_2$ electrolytically at an overvoltage lower than overvoltages for a conventional catalyst. Moreover, it was shown that the use of $B_4C$ as a catalyst for reducing $CO_2$ made it possible to obtain CO, $CH_4$, $C_2H_6$, etc. as products. $B_4C$ made it possible to reduce $CO_2$ electrolytically in an energy-saving manner, only with an external DC power supply at ordinary temperature.

The catalyst used in the method for reducing $CO_2$ of the present invention can be used for more environmentally-friendly configurations. The method for reducing $CO_2$ of the present invention can be applied to methods using a solar cell as an external power supply. The catalyst for reducing $CO_2$ can be applied, by combination with a photocatalyst, to catalysts which can be used with solar energy.

INDUSTRIAL APPLICABILITY

The present invention demonstrates that boron carbide ($B_4C$), which is a highly durable compound, is capable of reducing $CO_2$ electrolytically at an overvoltage lower than overvoltage required for conventional catalysts for reducing $CO_2$. Boron carbide makes it possible to produce $CH_4$, HCOOH, etc. from $CO_2$ with less energy. That is, the method for reducing $CO_2$ of the present invention can provide these useful substances from $CO_2$ at lower cost. Moreover, the $CO_2$ reduction treatment technique (the method for reducing $CO_2$ and the electrochemical cell used in the method) using boron carbide is also effective as a technique for reducing the amount of $CO_2$ against global warming. The $CO_2$ reduction treatment technique is expected to be useful as a more environmentally-friendly resource recycling method for the future if they are combined with photocatalytic technology and solar power generation technology.

What is claimed is:

1. A method for reducing carbon dioxide, comprising:
a step (a) of preparing an electrochemical cell, wherein
the electrochemical cell comprises a working electrode, a counter electrode and a vessel,
the vessel stores an electrolytic solution,
the working electrode contains boron carbide,
the electrolytic solution contains carbon dioxide,
the working electrode is in contact with the electrolytic solution, and
the counter electrode is in contact with the electrolytic solution;
a step (b) of applying a voltage between the working electrode and the counter electrode with an external power supply; and
a step (c) of reducing the carbon dioxide at the working electrode with the applied voltage and using the boron carbide as a catalyst, wherein
the electrochemical cell further comprises a tube,
one end of the tube is disposed in the electrolytic solution, and
in the step (c), the carbon dioxide is supplied to the electrolytic solution through the tube.

2. A method for reducing carbon dioxide, comprising:
a step (a) of preparing an electrochemical cell, wherein
the electrochemical cell comprises a working electrode, a counter electrode and a vessel,
the vessel stores an electrolytic solution,
the working electrode contains boron carbide,
the electrolytic solution contains carbon dioxide,
the working electrode is in contact with the electrolytic solution, and
the counter electrode is in contact with the electrolytic solution;
a step (b) of applying a voltage between the working electrode and the counter electrode with an external power supply; and
a step (c) of reducing the carbon dioxide at the working electrode with the applied voltage and using the boron carbide as a catalyst, wherein:
the vessel comprises a solid electrolyte membrane,
the solid electrolyte membrane is interposed between the working electrode and the counter electrode, and
a negative voltage is applied to the working electrode and a positive voltage is applied to the counter electrode.

3. The method according to claim 2, wherein:
the voltage is equal to or greater than 0.9 V in the counter electrode based on a silver/silver chloride electrode as a reference electrode in contact with the electrolytic solution, and
the electrolytic solution is in contact with the working electrode.

* * * * *